United States Patent
Maillot

(10) Patent No.: US 7,483,024 B2
(45) Date of Patent: Jan. 27, 2009

(54) ACCELERATED RAY-OBJECT INTERSECTION

(75) Inventor: Jerome Maillot, Toronto (CA)

(73) Assignee: Autodesk, Inc., San Rafael, CA (US)

( * ) Notice: Subject to any disclaimer, the term of this patent is extended or adjusted under 35 U.S.C. 154(b) by 269 days.

(21) Appl. No.: 10/748,235

(22) Filed: Dec. 31, 2003

(65) Prior Publication Data

US 2005/0146522 A1 Jul. 7, 2005

(51) Int. Cl.
*G06T 17/00* (2006.01)
(52) U.S. Cl. ....................................... 345/420
(58) Field of Classification Search ............ None
See application file for complete search history.

(56) References Cited

U.S. PATENT DOCUMENTS

| 6,021,358 | A * | 2/2000 | Sachs ........................... 700/98 |
| 6,249,287 | B1 * | 6/2001 | Yamrom ....................... 345/419 |
| 6,249,600 | B1 * | 6/2001 | Reed et al. ................... 382/154 |
| 6,489,955 | B1 * | 12/2002 | Newhall, Jr. ................. 345/419 |
| 6,515,658 | B1 * | 2/2003 | Endoh ........................ 345/419 |
| 6,545,676 | B1 * | 4/2003 | Ryan et al. ................... 345/423 |
| 6,597,359 | B1 * | 7/2003 | Lathrop ....................... 345/440 |
| 2003/0179203 | A1 * | 9/2003 | Bruderlin et al. ............. 345/473 |
| 2004/0001110 | A1 * | 1/2004 | Khan .......................... 345/848 |

OTHER PUBLICATIONS

Glassner, Andrew, Spacetime Ray Tracing for Animation, Mar. 1988, pp. 60-70 IEEE Computer Graphics and Applications, Vo. 8, No. 3, pp. 60-70.*
Suzuki, H., Takeuchi, S., Kanai, T., Kimura, F., Subdivision Surface Fitting to a Range of Points, 1999, Seventh Pacific Conference on Computer Graphics and Applications, p. 158-168.*
Sturzlinger, W., Bounding Volume Construction Using Point Clouds, Jun. 1996, Spring Conference on Computer Graphics '96, pp. 1-8.*

* cited by examiner

*Primary Examiner*—Jin-Cheng Wang
*Assistant Examiner*—Said Broome
(74) *Attorney, Agent, or Firm*—Staas & Halsey LLP

(57) ABSTRACT

An original mesh is provided with a bounding surface and a convex hull surface. A first tessellation links the convex hull to the original mesh, and a second tessellation links the bounding surface to the convex hull. Using the tessellations to find a first intersection between a ray and the original mesh by finding a first intersected polygon of the bounding surface, and then traversing adjacent intersected polygons starting from the first intersection until the intersection is found. When the ray is moved, a second ray-surface intersection can be found by finding a polygon locally near the first intersection and containing a first intersection with the moved ray, traversing out from the local polygon through adjacent polygons intersected by the moved ray, and determining whether traversed polygons are unoccluded based on whether they are part of the convex hull surface.

17 Claims, 17 Drawing Sheets

PRIOR ART

PRIOR ART

PRIOR ART

192

| tetrahedron set {T1} | |
|---|---|
| tetrahedron | neighbors |
| t1 | t2, t3 |
| t2 | t1, t5 |
| t3 | t1, t4 |
| t4 | t3, t5, (t7) |
| t5 | ... |
| ... | ... |

193

| tetrahedron set {T2} | |
|---|---|
| tetrahedron | neighbors |
| t7 | (t4), t8 |
| t8 | t7, t9 |
| t9 | t8, t10, t12 |
| t10 | ... |
| ... | ... |

Figure 10

ACCELERATED RAY-OBJECT INTERSECTION

BACKGROUND OF THE INVENTION

1. Field of the Invention

The present invention is directed to a method, system, and data structure, for finding a ray-object intersection. More particularly, the present invention is directed to a lightweight polyhedrization data structure, using it to find an intersection, and using it to quickly find successive unoccluded or Nth-closest intersections when relatively minor movements of the ray or object occur relative to each other.

2. Description of the Related Art

FIG. 1 shows a ray 50 originating at a virtual camera or viewpoint 52 and intersecting an object 54 at an intersection 56. A screen buffer 58 is also shown. It is a well-known problem in the field of computer graphics to need to find the intersection between a ray and an object. Ray-object intersections are used for various applications such as ray-tracing, painting onto 3-D models, virtual space simulation such as collision detection, and so on.

Finding an intersection between a ray and a simple object such as a sphere, plane, polyhedron, etc. is not difficult. However, it is a nontrivial problem to efficiently find an intersection between a ray and a complex object such as a mesh surface, and in particular it is nontrivial to efficiently find the intersection that is closest to the origin of the ray.

FIG. 2 shows a prior art technique for finding a ray-object intersection. An intersection can be found by first rendering 70 every pixel onto the screen or screen buffer 58.

Then, starting 72 from the object 54, triangles are projected 74 back onto the screen buffer 58, which fills the screen buffer 58 with the frontmost pixels of the object 54 as viewed from the virtual camera 52. The intersection 56 of the ray 50 with the object 54 is determined 76 by reading 78 pixels from the screen buffer 58. The pixel intersecting with the ray 50 tells 80 which face or part of the object 54 is closest to the virtual camera 52. There are several drawbacks to this prior art intersection technique. If the viewpoint or virtual camera 52 changes, or if the object 54 is rotated, translated, modified, etc., then the entire process must be repeated, including recomputing the contents of the buffer 58. Furthermore, the resolution or granularity of the intersection 56 depends on the resolution of the screen buffer 58. It is not possible to definitely determine an intersection with a feature of the object 54 that is more precise than the size of a pixel in the screen buffer 58. Also, the prior art has generally used graphics hardware such as a graphics card to compute depth using a Z buffer. However, such hardware has limited depth precision, such as 16 or 24 bits, which may introduce depth precision artifacts for objects that are close to each other.

The prior art has not been able to obtain the N closest intersections to the ray's origin or an arbitrary Nth-closest intersection. Nor has the prior art observed that this ability could be useful when working with transparent or semi-transparent surfaces.

FIG. 3 shows another prior art technique for finding a ray-object intersection. The technique uses a grid or buffer of object IDs that indicate which faces of object 54 correspond to which pixels. First, a bounding box is computed 100 for the object 54. The bounding box is subdivided 102 where some geometry of the object 54 is encountered. This is repeated until a predetermined stopping point is reached 104. The resulting bounding box tree and voxels (object IDs) are used to determine 106 the intersection 56. This technique also has problems.

One triangle can belong to several voxels, so matching between a small element in the grid and the piece of geometry is not a one-to-one matching. It is also necessary to determine when to stop subdividing the bounding box tree. If the bounding box is subdivided 102 more than necessary, then memory use and performance will be adversely affected. Inadequate subdividing 102 can result in insufficient resolution.

What is needed is a system, method, and data structure for efficiently determining ray-object intersections without disadvantages such as those mentioned above.

SUMMARY OF THE INVENTION

It is an aspect of an embodiment described herein to provide a data structure that is easy to compute, and which may be used to quickly and accurately find ray-object intersections.

It is another aspect of an embodiment described herein to provide a method for using the data structure to find a second intersection based on a first intersection when small perturbations or movements of the ray or object occur.

It is still another aspect of an embodiment described herein to provide a data structure with a simple bounding surface linked by a polyhedrization to a bounding volume such as the convex hull of an object (or any polyhedral shape around the object) linked by another polyhedrization to the object.

It is still another aspect of an embodiment described herein to provide a polyhedrization constrained to and bounding a high resolution model, where the polyhedrization has low resolution outer faces.

It is yet another aspect of an embodiment described herein to quickly determine an accurate intersection with a complex mesh.

It is a further aspect of an embodiment described herein to quickly compute consecutive coherent intersections, and in particular unoccluded intersections or Nth-order intersections for arbitrary values of N.

It is still another aspect of an embodiment described herein to provide a data structure for rapid intersection determination, where the data structure can be used despite transformations of the object.

It is another aspect of an embodiment described herein to determine whether an intersection of a line with a model surface is an outermost point of intersection between the line and the model surface.

It is yet another aspect of an embodiment described herein to provide a data structure for determining ray-object intersections, where the data structure is naturally adapted to the geometry of the object, and where the data structure is a polyhedrization with polyhedrons that generally become smaller in the direction of the object.

The above aspects can be attained by a system that provides an original mesh with an outer bounding surface and a tight inner bounding surface such as a convex hull surface. A first tessellation links the tight inner surface to the original mesh, and a second tessellation links the bounding surface to the tight inner surface. The tessellations may be used to find a first intersection between a ray and the original mesh by finding a first intersected polygon of the bounding surface, and then traversing adjacent intersected polygons starting from the first intersection until the intersection is found. When the ray is moved, a second ray-surface intersection can be found by finding a polygon locally near the first intersection and containing a first intersection with the moved ray, traversing out from the local polygon through adjacent polygons intersected by the moved ray, and determining whether traversed polygons are unoccluded based on whether they are part of the tight inner surface.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIGS. 6-9B show simplified two-dimensional representations of a three-dimensional data structure used for finding ray-object intersections.

FIG. 6 shows a computed tight inner surface-of an object or model surface.

FIG. 7 shows a tetrahedrization of the interior of the tight inner surface.

FIG. 8 shows a bounding surface or bounding volume containing the object or model surface and its tight inner surface and the tetrahedrization.

FIG. 9B shows a smaller example of a tessellation where no new points have been added to the original model except for the four corners of the bounding rectangle.

FIG. 10 shows two tables.

DETAILED DESCRIPTION OF THE PREFERRED EMBODIMENTS

The following definitions may assist the reader. A tessellation is a general subdivision of a spatial domain, where there is no implied maximum dimension. A triangulation is a connectivity scheme that is made up of triangular elements that tessellate a planar region.

A Delaunay triangulation is a triangulation that has the additional condition that the circumcircle uniquely defined by the three points on a face will not contain any other points in the domain. A constrained Delaunay triangulation forces specified edges into the triangulation, and adds new edges based on specific visibility and Delaunay criteria. A Delaunay tessellation is analogous to a Delaunay triangulation in the spatial domain. A tetrahedrization is a 3D tessellation that is made up of tetrahedrons. To tetrahedrize something is to construct a tetrahedrization. A polyhedrization is a tessellation of 3 or more dimensions made of polyhedrons of the same dimension. A line is a linear path either straight or with arbitrary curves or both. For example, a line can be a NURBS. A line may also have a starting point and/or a direction (e.g. rays). An intersection is a place or area where two or more things intersect, and can be, for example, a point, a polygon, a polyhedron or face thereof, etc. These definitions as used herein also encompass curved equivalents such as NURBS (edges or surfaces), deformed cubes, and so on.

Figure 1:
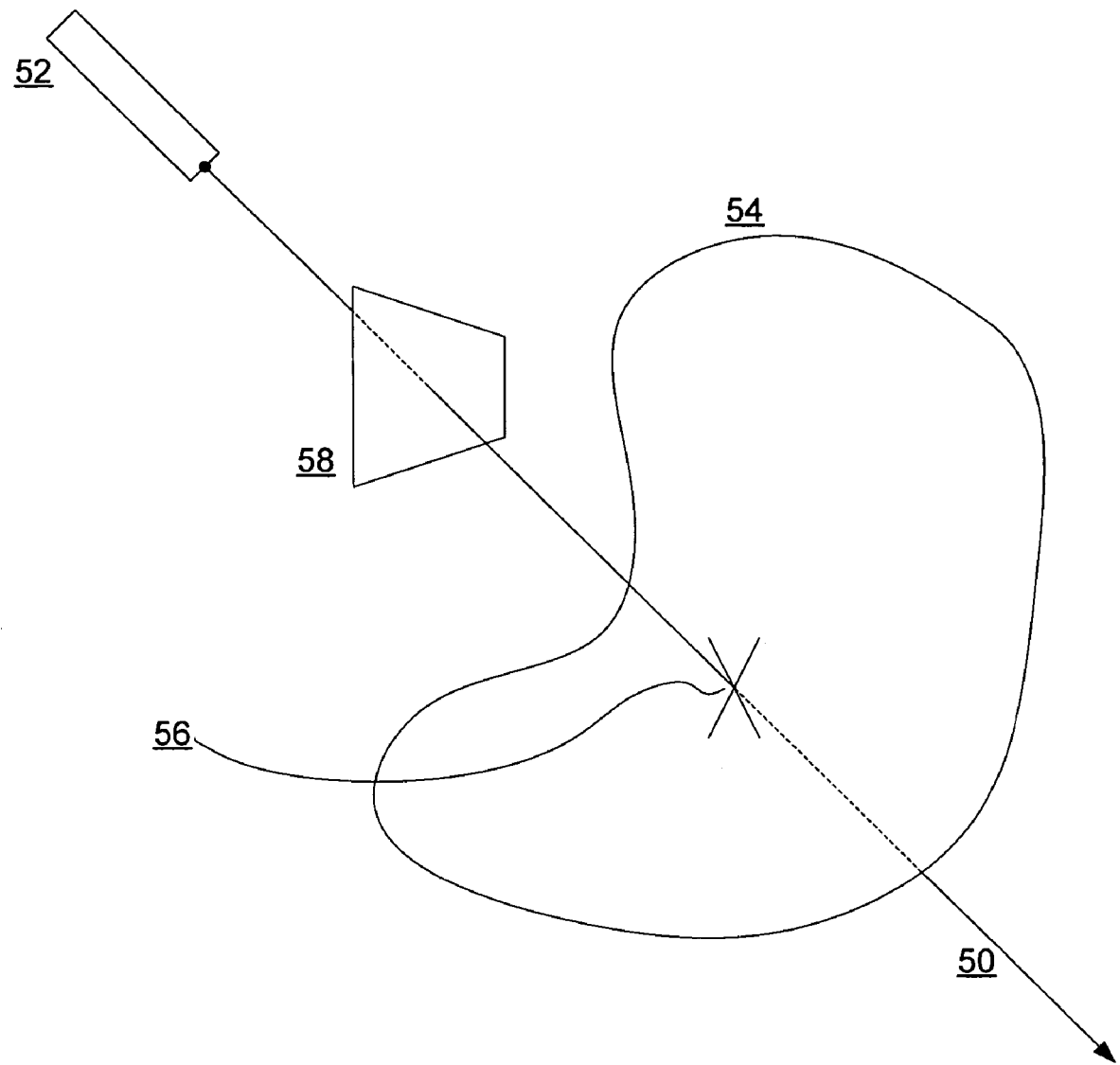
FIG. 1 shows a ray originating at a virtual camera or viewpoint and intersecting an object at an intersection.
Figure 2:
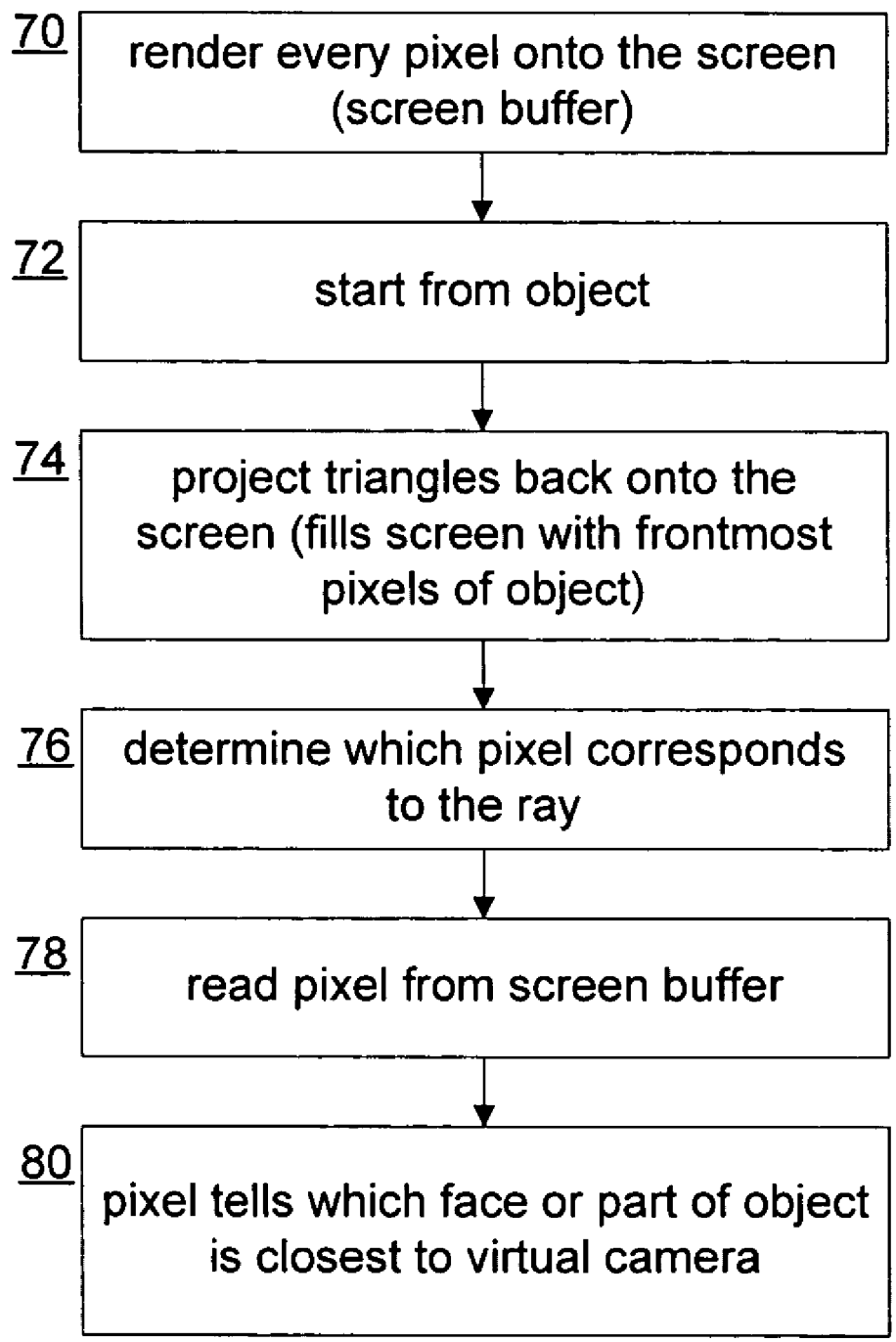
FIG. 2 shows a prior art technique for finding a ray-object intersection.
Figure 3:
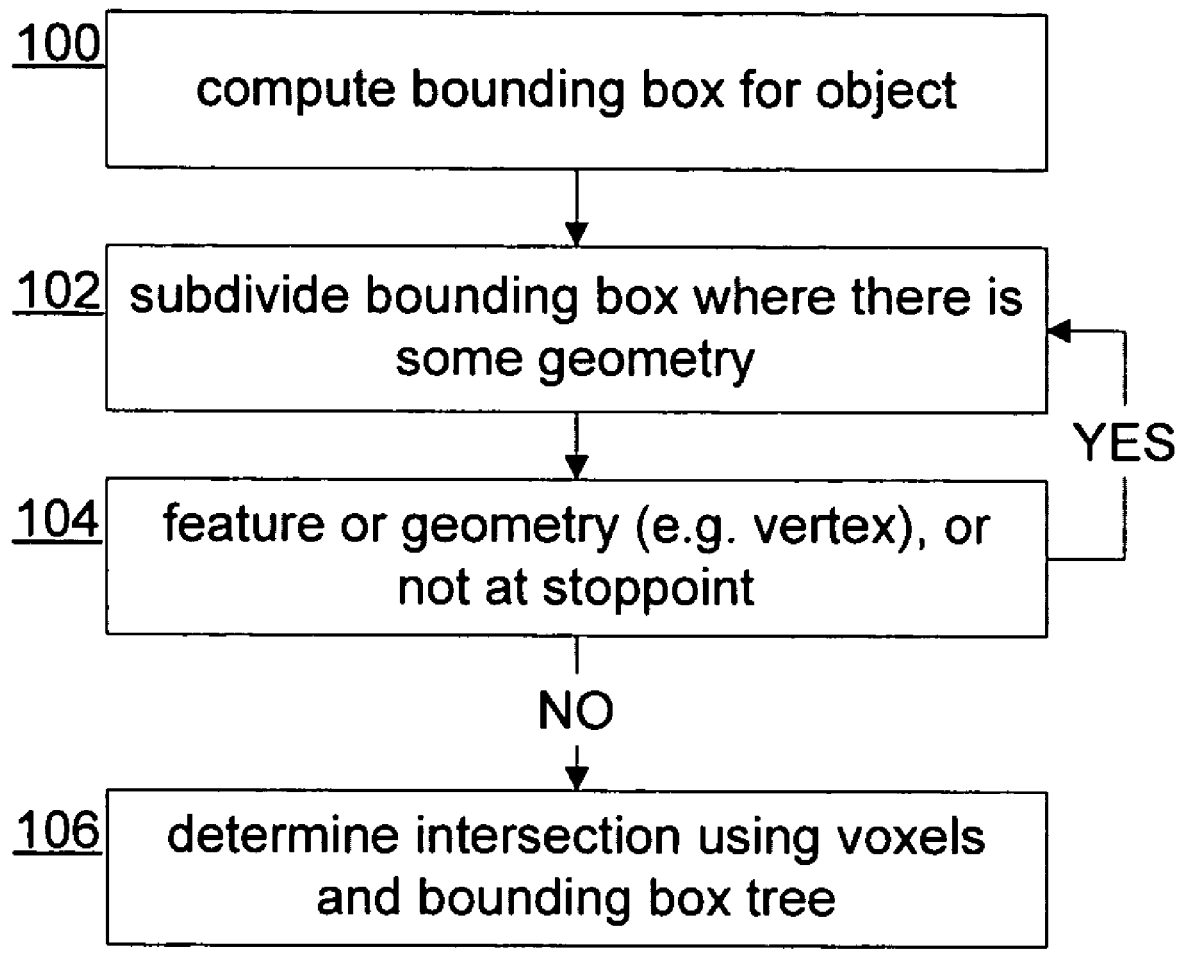
FIG. 3 shows another prior art technique for finding a ray-object intersection.
Figure 4:
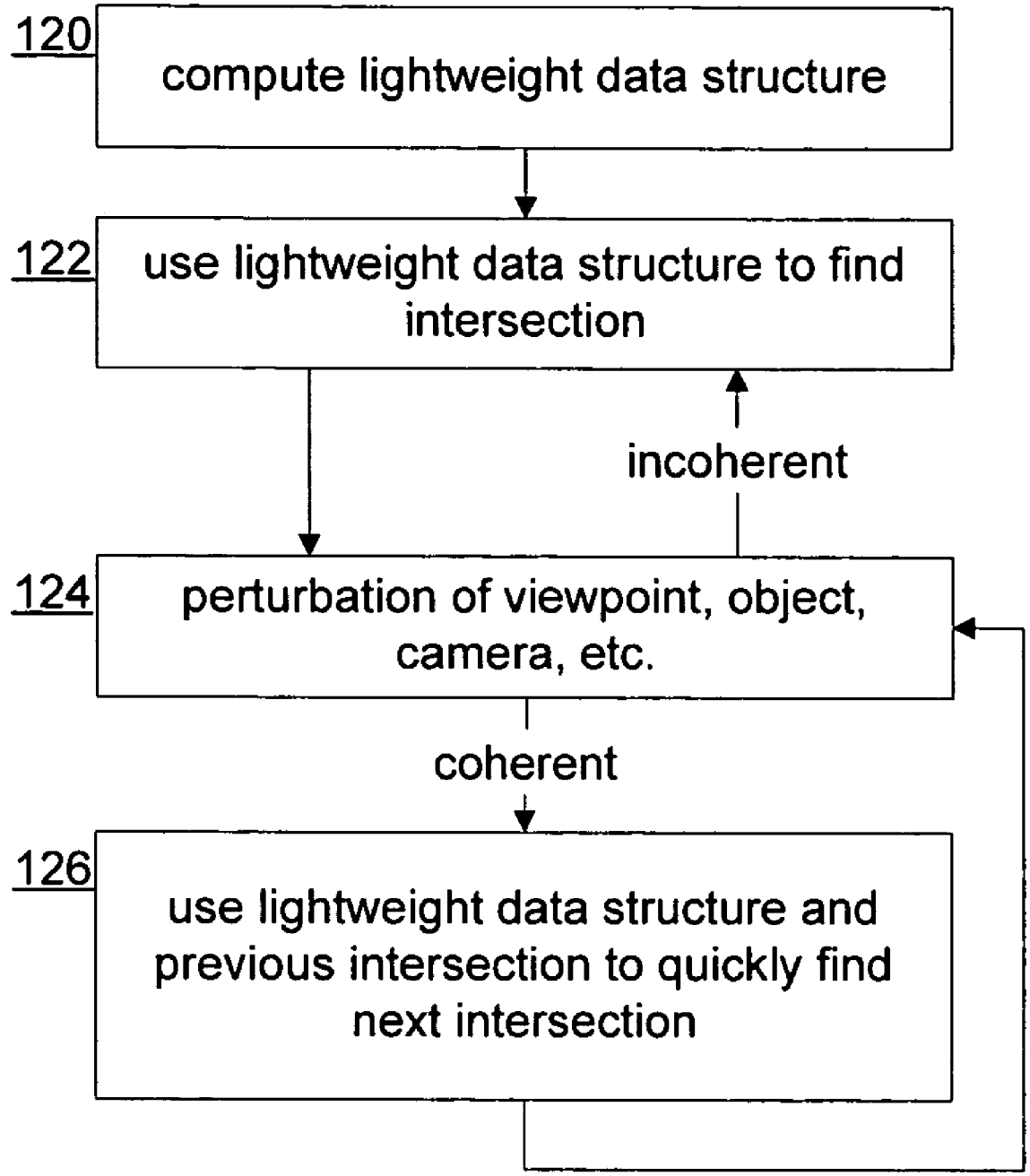
FIG. 4 shows an overview of aspects of intersecting a ray with an object.

FIG. 4 shows an overview of aspects of intersecting a ray with an object. Initially, a lightweight data structure is computed 120. The lightweight data structure in general comprises polygons or polyhedrons constrained to an original model, object, or surface 54 being intersected by a ray or line and will generally be a mesh. When the lightweight data structure has been computed 120, it may then be used to find 122 an intersection with the model surface 54. If the viewpoint, object, virtual camera, etc. is coherently perturbed 124, then the found 122 intersection can be used 126 with the lightweight data structure to quickly find a next intersection that is closest to the source ray (e.g. the outermost point or face of the object that intersects with the ray). If the viewpoint, object, virtual camera, etc. is incoherently perturbed 124, then the intersection is found 122 anew. Coherency indicates whether an intersection stays relatively local or whether it jumps to a distant part of the model 54, for example if an edge is exited, etc.

Figure 5:
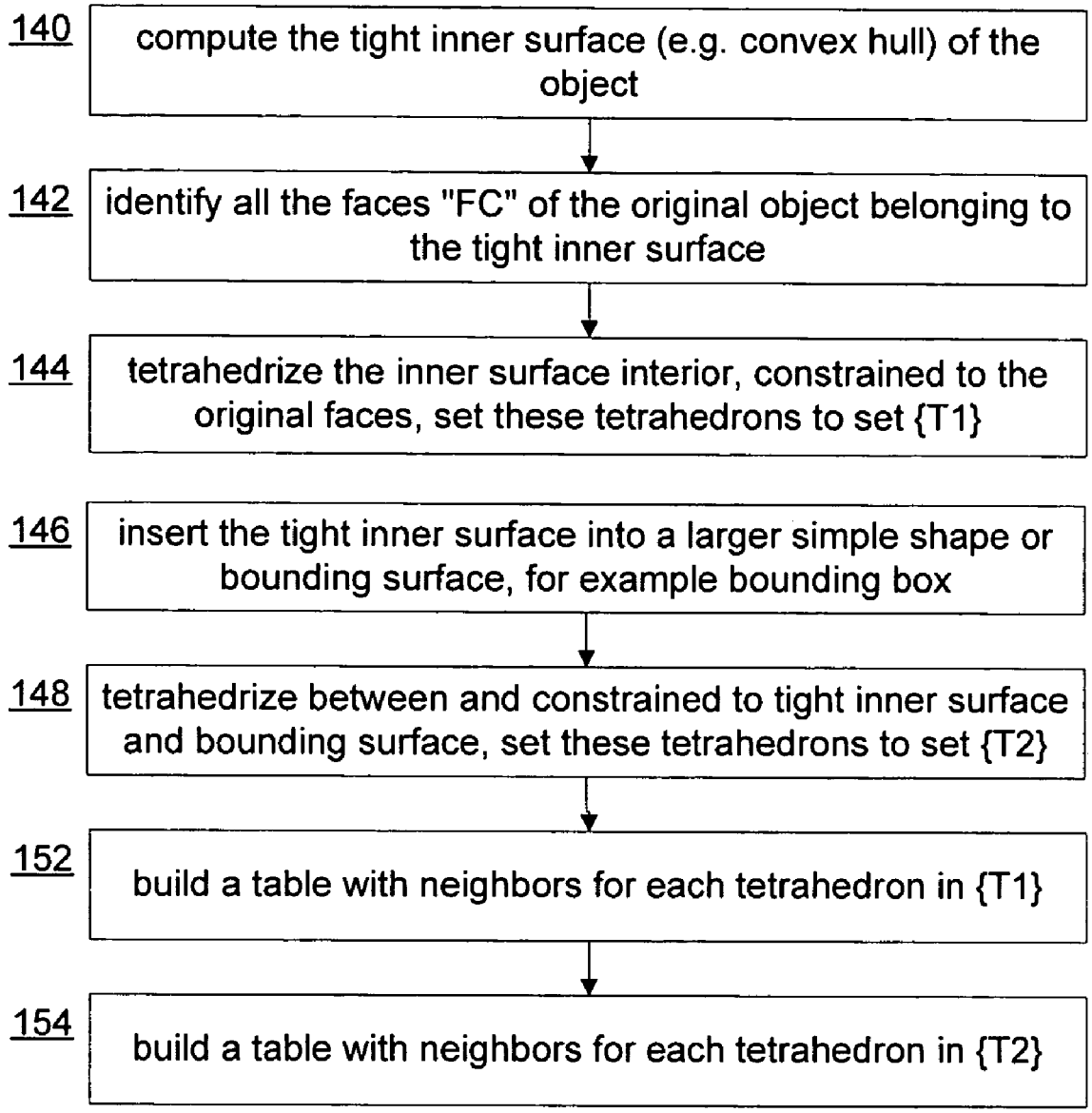
FIG. 5 shows a technique for computing a data structure.

FIG. 5 shows a technique for computing a data structure. First, a tight inner surface (e.g. a convex hull surface) is computed 140 for the object or surface 54. Methods for computing 140 a tight inner surface are well known and may be found in numerous computer graphic textbooks. Examples of algorithms for finding a tight surface or volume such as a convex hull include the Incremental algorithm, the Gift Wrap algorithm, the Divide and Conquer algorithm, and the Quick-Hull algorithm. Although a tight bounding volume or surface such as a convex hull is often understood to refer to a complete wrapping of an object, it is also used herein to refer to a portion or surface area of a more complete tight bounding volume surface.

That is to say, a tight bounding surface is a surface that is close to or convex with respect to a corresponding portion of a model to which it is wrapped.

Having computed 140 a tight inner surface, the faces of the tight inner surface that belong to the object or surface 54 are identified 142. This identity will be used when computing intersections. An interior of the tight inner surface is tessellated or tetrahedrized 144, with the tessellation or tetrahedrization 144 preferably constrained to pass through the original faces of the object or surface 54. The tetrahedrons in this tetrahedrization 144 are considered to form a set {T1}, which will also be used for determining intersections.

The tight inner surface (e.g. a portion of a convex hull) is inserted 146 into a larger simple bounding shape or surface, such as a bounding box. Again, descriptions of techniques for finding a bounding volume or bounding surface such as a bounding box are readily available.

The interior of the bounding surface is tetrahedrized 148 while being constrained to the tight inner surface. The tetrahedrons in tetrahedrization 148 are considered to form a set {T2}.

Preferably, the bounding surface is also tessellated before the tetrahedrization 148, but with much fewer triangles or polygons relative to a corresponding portion of the tight inner surface or the surface 54. For example, if a bounding box is used, each of the faces of the bounding box is tessellated into two triangles, resulting in a total of 12 triangles for the bounding box. By keeping the bounding volume or bounding surface simple, an intersection with the same can be found in constant time.

The tessellations or tetrahedrizations 144 and 148 are preferably calculated using a Delaunay tessellation or similar algorithm. This preferred method of tessellation facilitates an embodiment where either tessellation or tetrahedrization 144 or 148 adds vertices not part of either the bounding surface, the tight inner surface, or the original model surface. This helps to avoid elongated polygons or tetrahedrons.

To aid in calculating traversals or walks through adjacent tetrahedrons of tetrahedrizations 144, 148, a table of neighbors for each tetrahedron in set {T1} is built 152, and a table with neighbors for each tetrahedron in set {T2} is also built 154.

FIGS. 6-9B show simplified two-dimensional representations of a three-dimensional data structure used for finding ray-object intersections. Although described in terms of triangles and tetrahedrons, other embodiments of the data structure and methods that use polygons or polyhedrons are possible. Further dimensions are possible without much effort beyond including further parameters for the additional dimensions.

Figure 6:
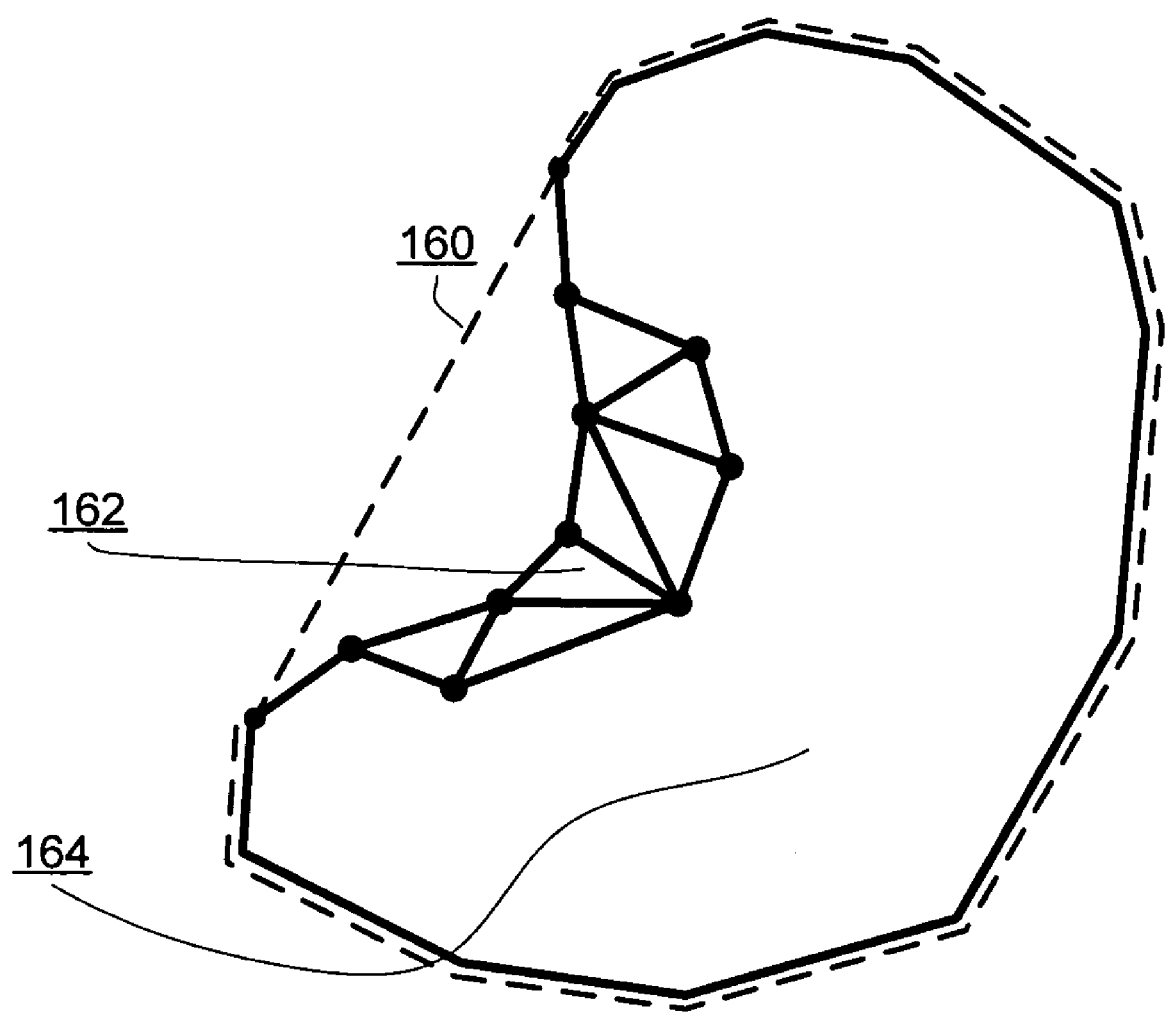

FIG. 6 shows a computed 140 tight inner surface 160 of an object or model surface 54/164. The tight inner surface 160 is a mesh that is guaranteed to minimally contain most or all points of the object or surface 164 (or a portion thereof, as the case may be). If a convex hull surface is used, the "convex hull surface" is analogous to a portion of a convex hull and has the same properties with respect to the portion of the model 164 to which it corresponds. The segment of dotted line (face) covering the cavity in FIG. 6 is a tight inner surface. Any combination of one or more continuous segments (faces) of the tight inner surface 160 is also a tight inner surface. The dashed lines two-dimensionally represent the faces, polygons, triangles etc. of the tight inner surface 160. The solid lines and vertices 162 are parts of the object or surface mesh 164. For clarity only some of the vertices and edges 162 of the object or surface mesh 164 are shown. Volumes are distinguished from portions thereof such as surfaces to make clear that the concepts described herein can be applied locally as well as globally. For example, it may not be necessary to take into account one side of an object if it is known that the other side will never be visible. For example, when an object is in a game room and a player will not be allowed to go behind the object.

Figure 7:
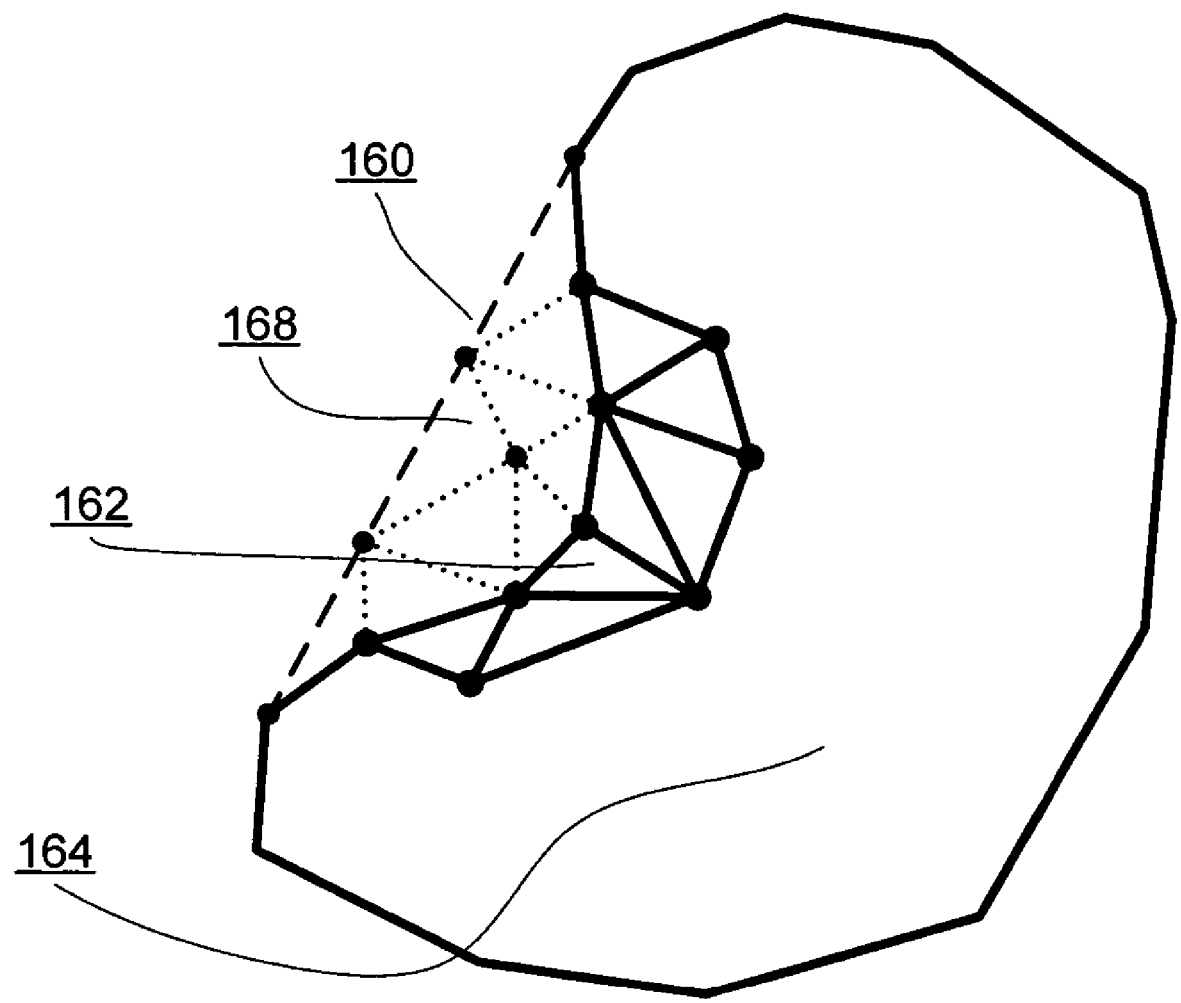

FIG. 7 shows a tetrahedrization 144/168 of the interior of the tight inner surface 160. The tetrahedrization 168 of the interior of the tight inner surface 160 has tetrahedrons whose triangles or faces are two-dimensionally represented by dotted lines. Although not shown, preferably the tetrahedrization 168 of the tight inner surface 160 is performed both in regions between the tight inner surface 160 and the surface mesh 164, as well as the interior of the object or surface mesh 164 (e.g. see the dotted line between t17 and t19 in FIG. 13). As discussed later with reference to FIGS. 13 and 14, this will aid in determining whether a potential intersection is an outermost intersection.

Figure 8:
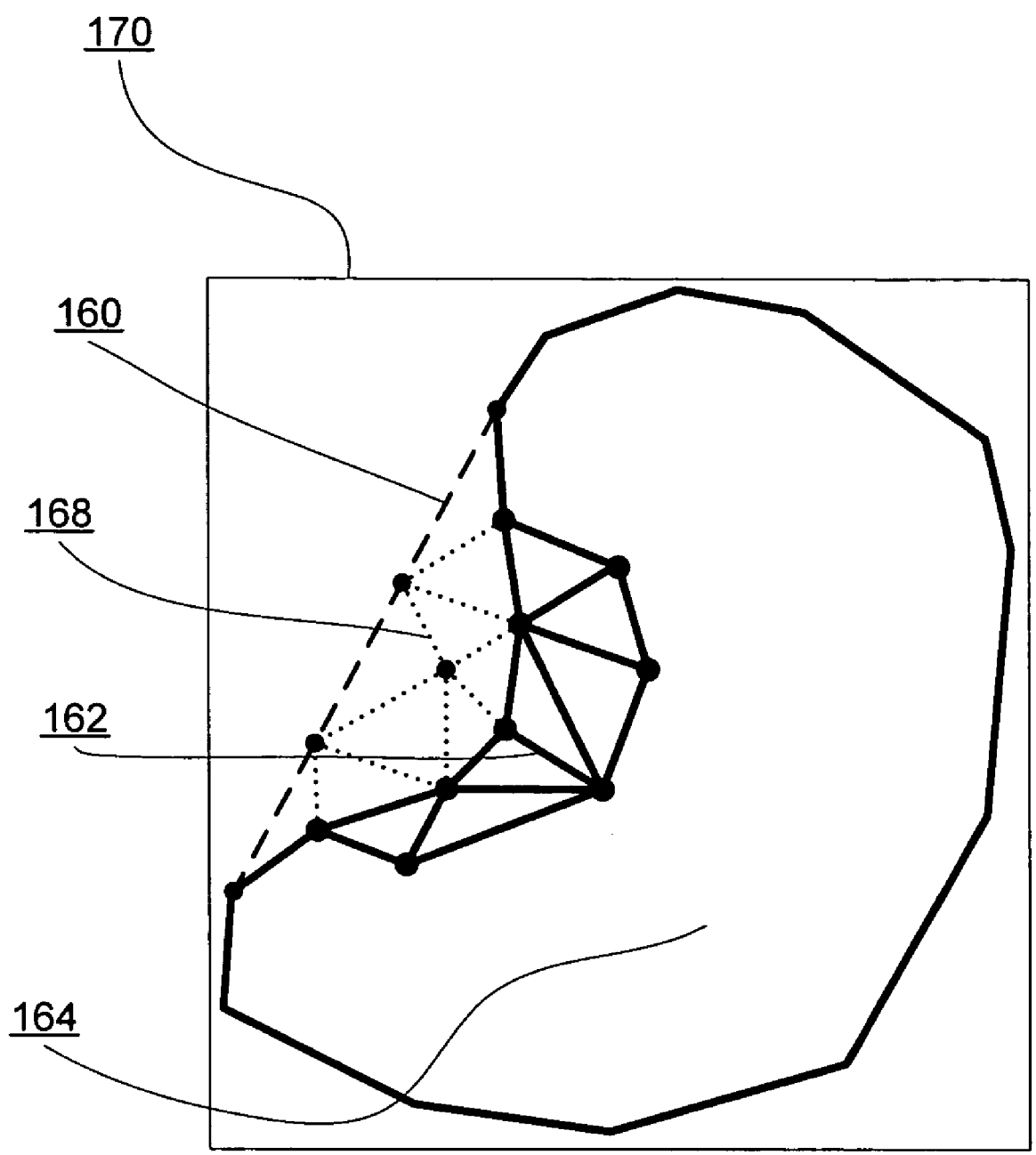

FIG. 8 shows a bounding surface or bounding volume 170 containing or bounding the object or model surface 164 (and by implication its tight inner surface 160 and the tetrahedrization 168). Preferably, a bounding volume or surface 170 will fit closely to the tight inner surface 160 with a minimal number of large faces. Again, a bounding surface can be a portion of a bounding volume. A "bounding surface" is a simple surface that, for a corresponding portion of object or model surface 164, is guaranteed to not be on the inside of such portion or is guaranteed to be on only one side of such portion. A bounding volume 170 is guaranteed to not be inside of the entire object or model surface 164. The same properties necessarily hold true for the tight inner surface 160.

Figure 9A:
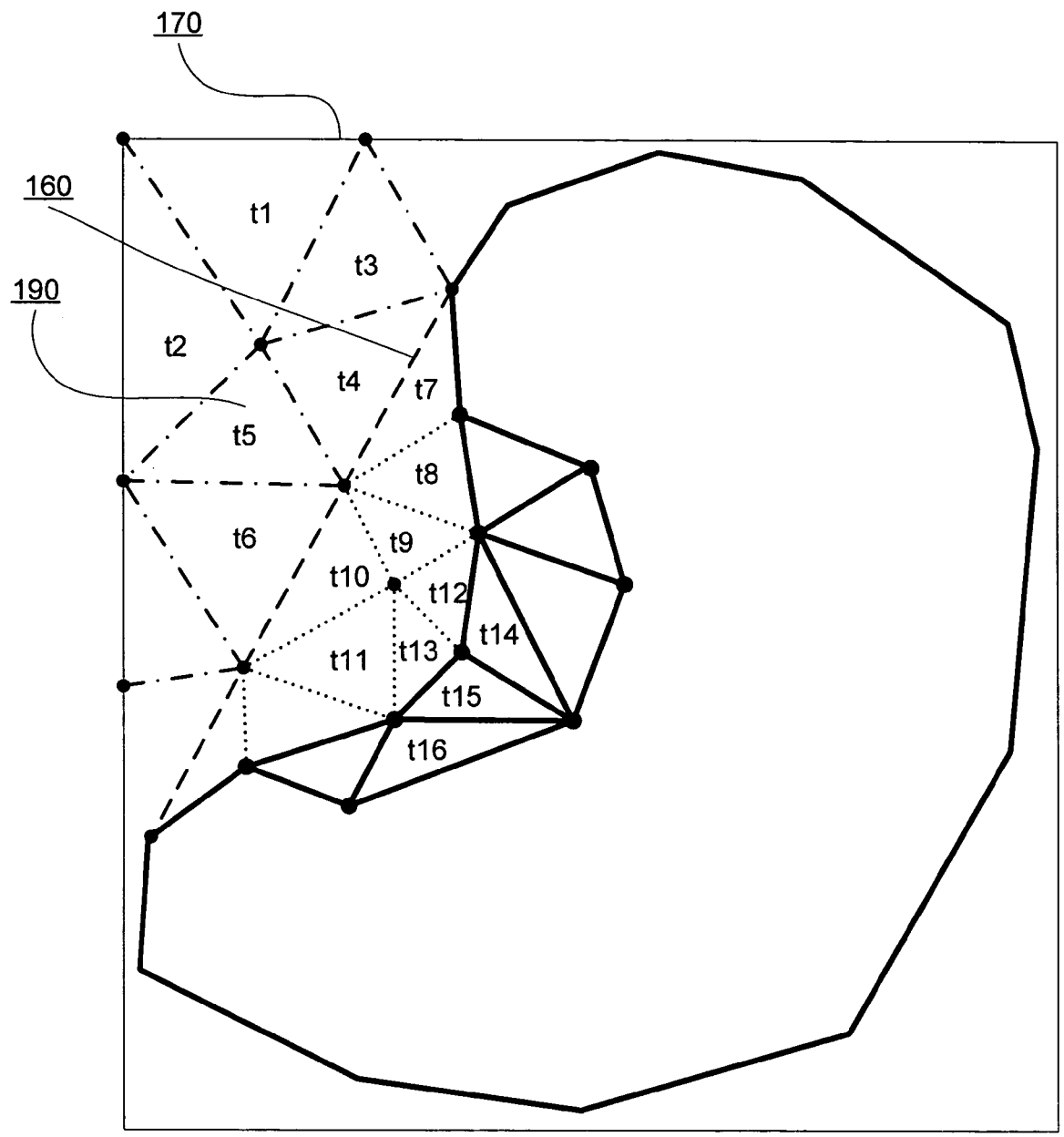
FIG. 9A shows a tetrahedrization of the region between the bounding volume or surface and the tight inner surface.
Figure 9B:
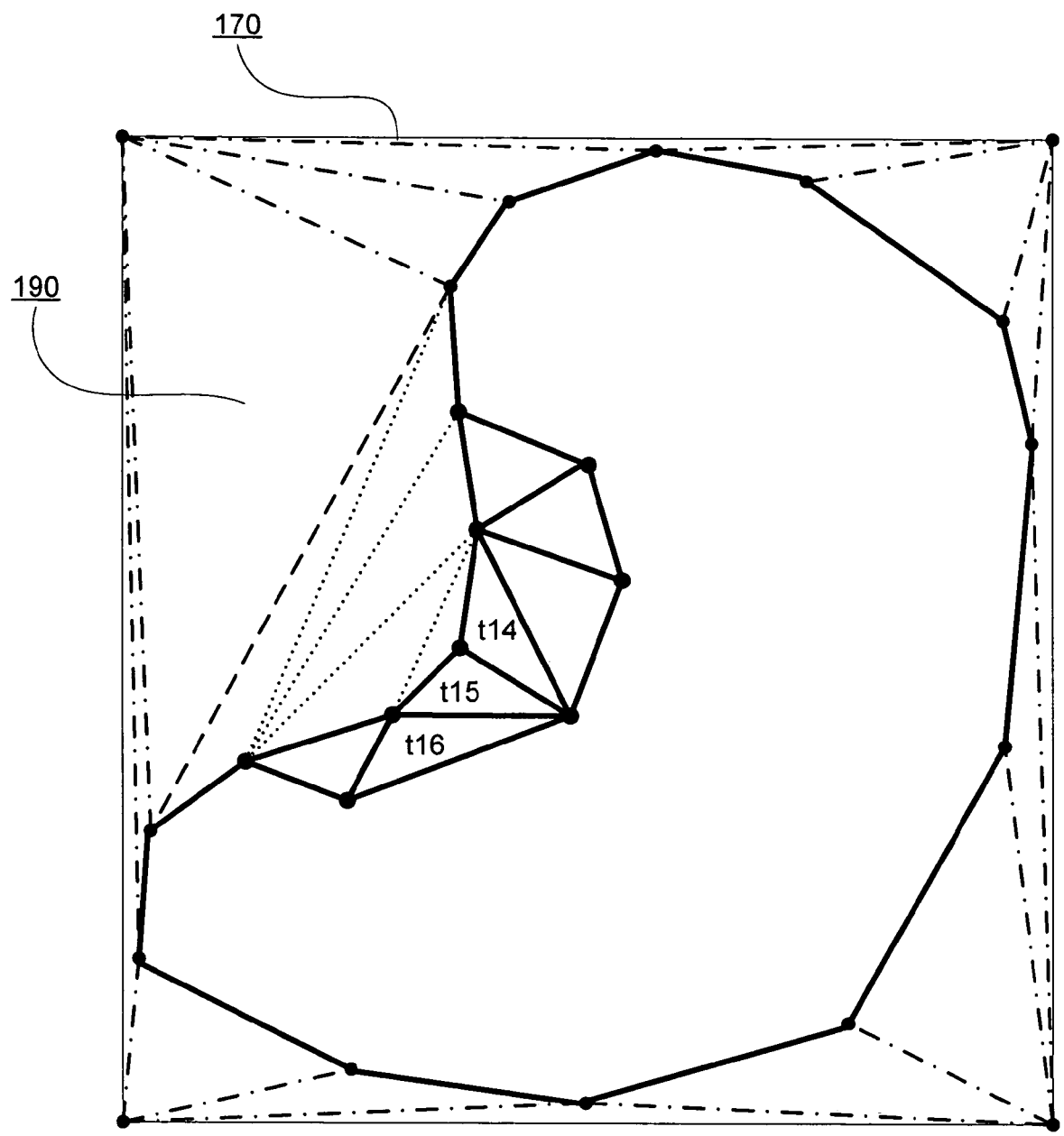

FIG. 9A shows a tetrahedrization 148/190 of the region between the bounding volume or surface 170 and the tight inner surface 160. FIG. 9B shows a smaller example of a tessellation where no new points have been added to the original model except for the four corners of the bounding rectangle 170. In general, the approach of, FIG. 9B will be sufficient and preferred, unless very elongated triangles begin to introduce precision errors. The faces or triangles of the tetrahedrons of the tetrahedrization 190 are two-dimensionally represented as dash-dot lines. As can be seen in FIG. 9A, in general the size of the polygons or polyhedrons of the tetrahedrizations 168 and 190 tends to decrease in size in the direction of the surface mesh 164. Furthermore, this generally occurs when, as is preferable, the resolution (e.g. vertex density) of the bounding surface 170 is low relative to the density or resolution of the surface mesh 164. Also, it should be noted that the tetrahedrizations 168 and 190 differ from a bounding volume tree or hierarchy such as an octree in that the tetrahedrons (or polyhedrons, depending on the implementation) form a cell-like structure of neighbor tetrahedrons, rather than a hierarchical or tree-like structure of parent polyhedrons containing child polyhedrons.

Unlike octrees and other hierarchical structures, the present approach uses the fact that the object boundary is contained, preferably exactly, in the union of all tetrahedron boundaries. A further feature of the tetrahedrizations 168 and 190 is that they naturally conform to or reflect the geometry of the surface mesh 164. Furthermore, a natural consequence of the bounding volume or surface 170 being larger and simpler (fewer vertices) than the tight inner surface 160 and object or model surface 164 is that the tetrahedrons or polygons of the tetrahedrizations therebetween tend to decrease in size as approaching the object or model surface 164. It is again noted that the figures generally show two dimensions for the purpose of discussion. However, the figures can be readily generalized to three or more dimensions.

FIG. 10 shows tables 192 and 193. Table 192 lists neighbors of each tetrahedron in tetrahedrons set {T1}. Table 193 lists neighbors of each tetrahedron in tetrahedrons set {T2}. Preferably, neighbors of the tetrahedrons of set {T1} that are in set {T2} are so identified (see the circles in FIG. 10). Similarly, neighbors of the tetrahedrons of set {T2} that are in set ({T1} are also identified as such. The tables 192 and 193 can be used to help traverse through the tetrahedrizations 168 and 190, and to help in the intersection determinations discussed below.

Figure 11:
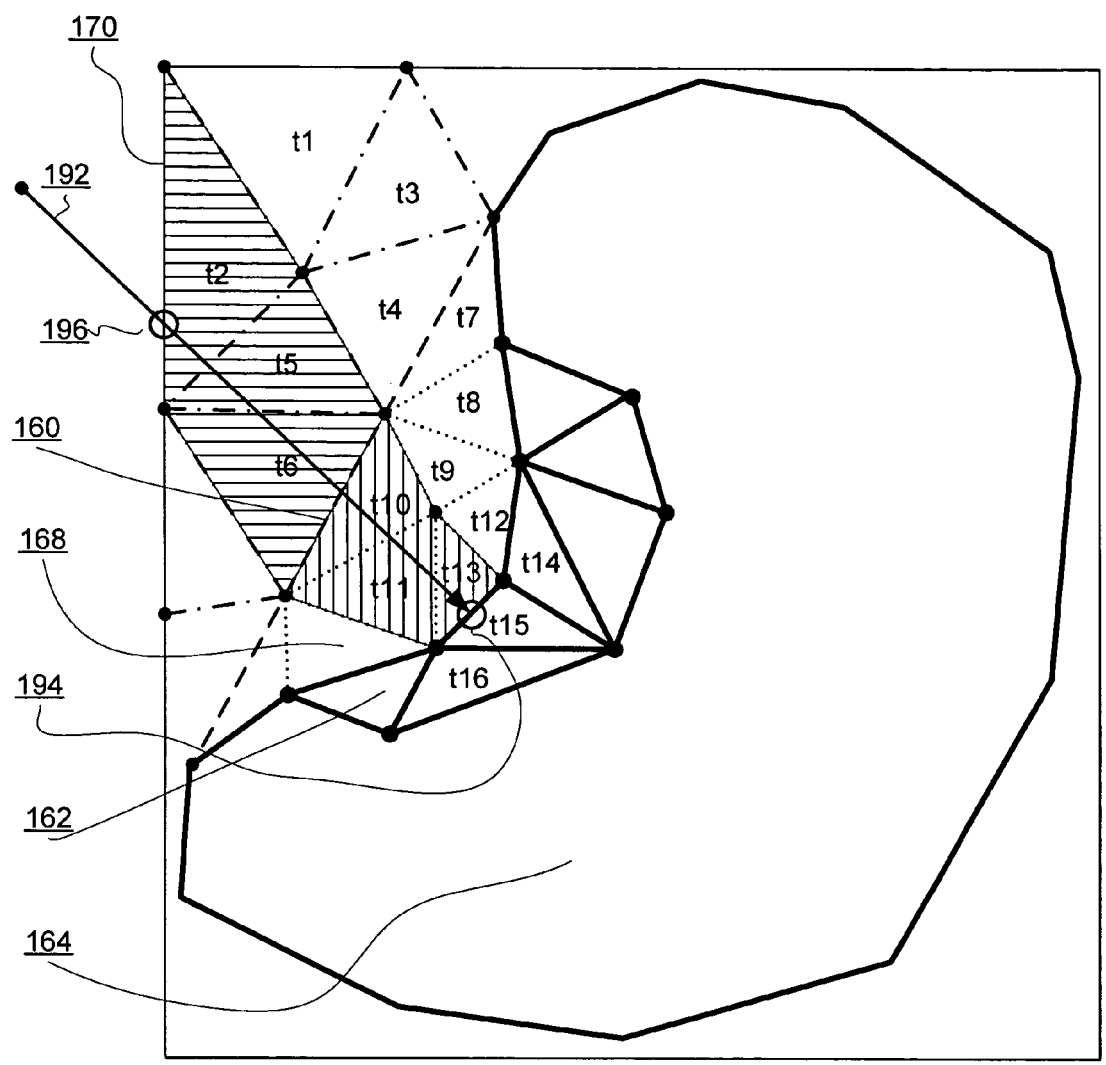
FIG. 11 shows an example of tetrahedrons traversed by a ray that intersects the object or surface mesh at an intersection with the object or surface.

FIG. 11 shows an example of tetrahedrons traversed by a ray 192 that intersects the object or surface mesh 164 at an intersection 194 with the object or surface 164. A process for finding the intersection 194 will be explained later with reference to FIG. 12. The ray 194 and bounding surface 170 intersect at intersection 196. The horizontally shaded tetrahedrons (t2, t5, t6) are tetrahedrons in set {T1} that are traversed by the ray 192. The vertically shaded tetrahedrons (t10, t11, t13) are the tetrahedrons in set {T2} that are traversed by the ray 192.

Figure 12:
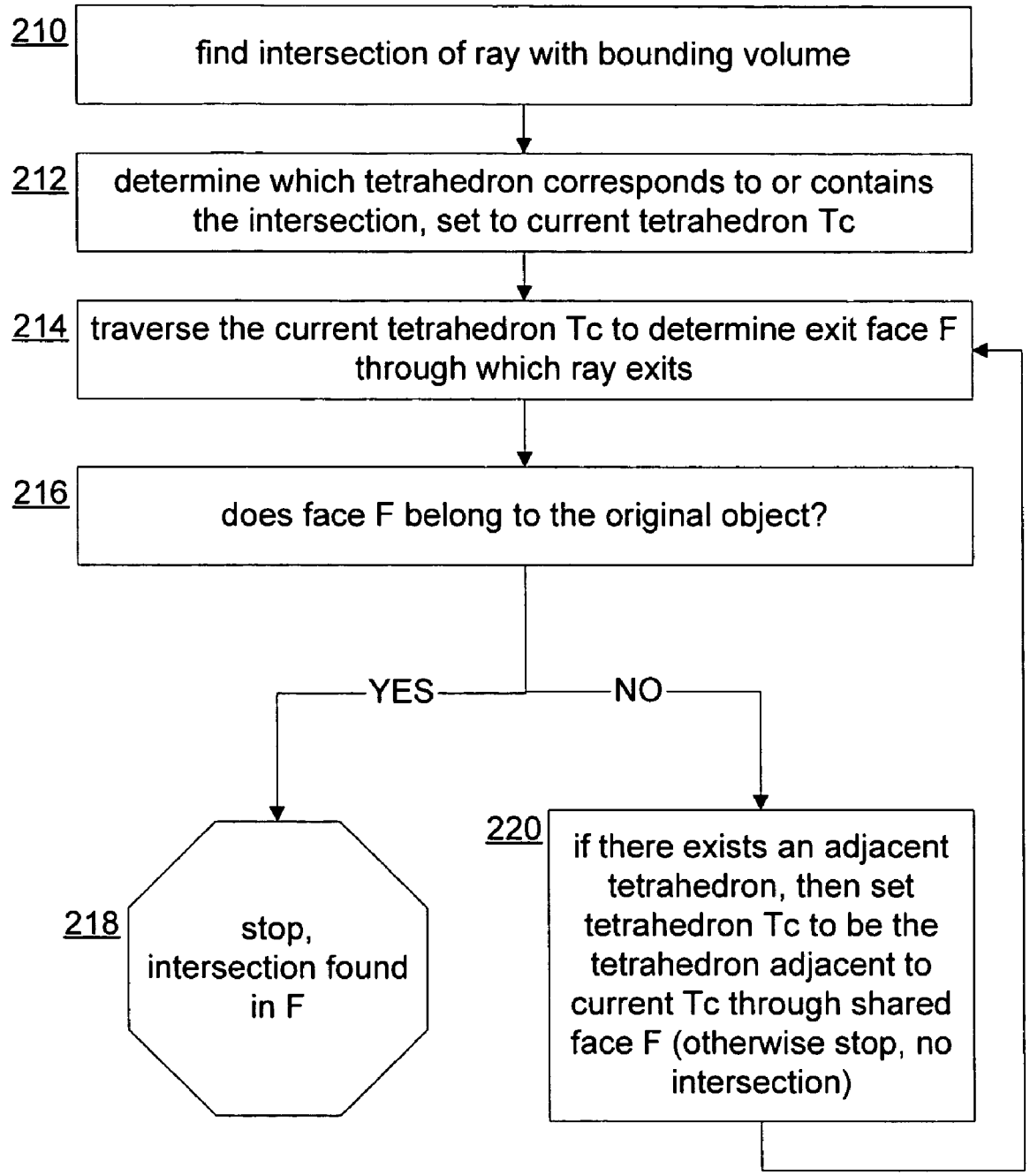
FIG. 12 shows a process for finding the intersection.

FIG. 12 shows a process for finding the intersection 194. Given ray 192, an intersection 196 between ray 192 and bounding object or surface 170 is found 210. Then, it is determined 212 which tetrahedron in set {T1} contains the intersection 196. This tetrahedron is set to the current tetrahedron Tc. The current tetrahedron Tc is traversed 214 to determine the face F through which the ray 192 exits. If the exit face F belongs 216 to object or model surface 164, then the intersection 194 has been found and a process stops 218. If the face F does not belong 216 to the original object or model surface 164, then if there is an adjacent tetrahedron the current tetrahedron Tc is set 220 to be the tetrahedron adjacent to the current tetrahedron through shared common face F. If there is no adjacent tetrahedron then there is no intersection.

Steps 214, 216, and 220 are repeated as necessary. The adjacent tetrahedrons can be found using tables 192 and 193. In the case where a convex hull surface is used as the tight inner hull surface (i.e. {T2} is convex), then at step 220 the process can be further optimized by determining if the current tetrahedron is moving from {T2} to {T1}. If this occurs, then it is known that there will not be any intersection, and the process can terminate immediately.

In the example seen in FIG. 11, the intersection 196 is found 210 and determined 212 to correspond to tetrahedron t2, which is set to the current tetrahedron Tc. Tetrahedrons t5, t6, t10, t11, and t13 are traversed 214 until a face of tetrahedron t15 is determined to belong 216 to the original object or model surface 164.

Figure 13:
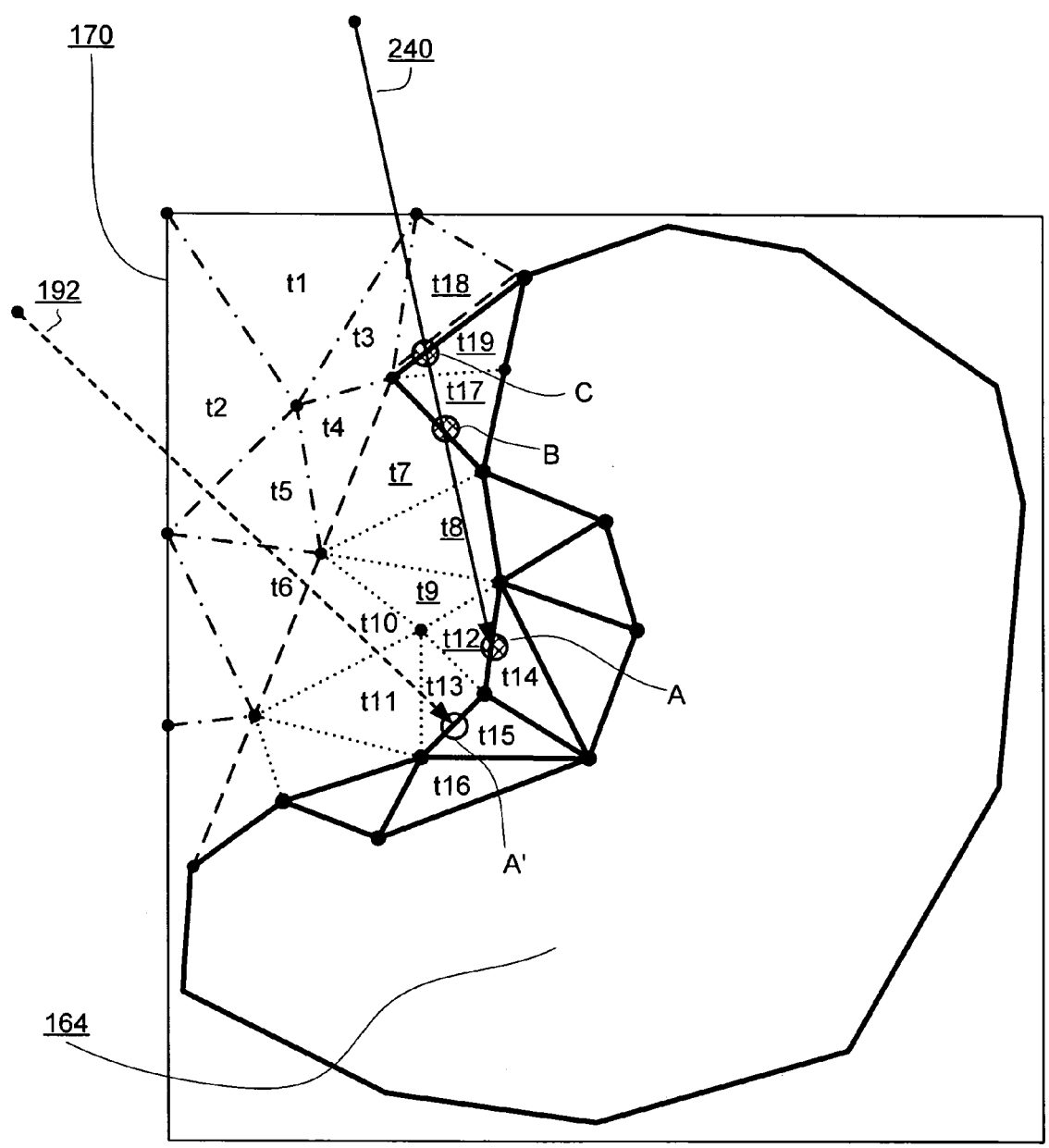
FIG. 13 shows a subsequent ray resulting from a perturbation of the ray relative to the object or model surface.
Figure 14:
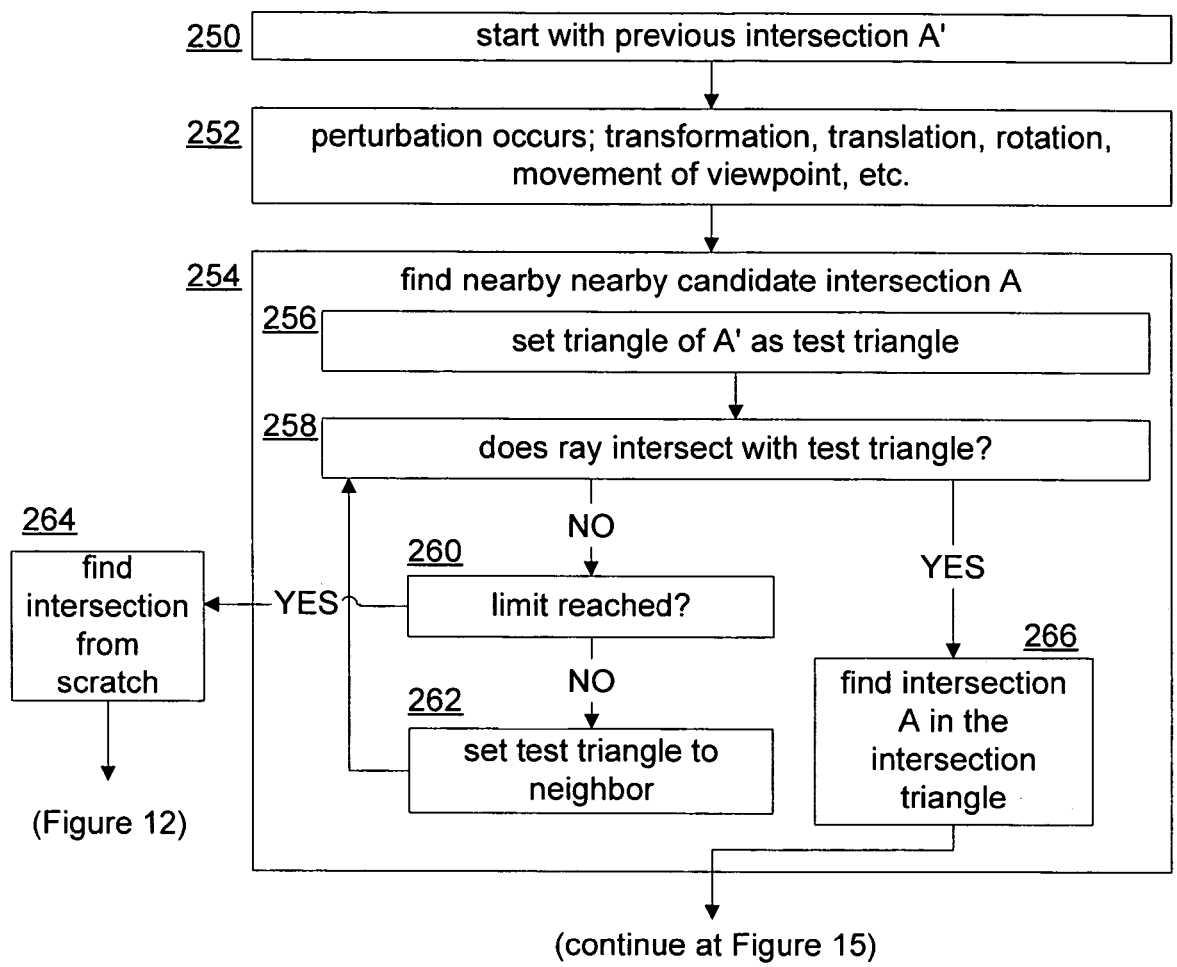
FIG. 14 shows a process for finding or predicting a second point A on a surface based on a movement of a first point A' on the surface.
Figure 15:
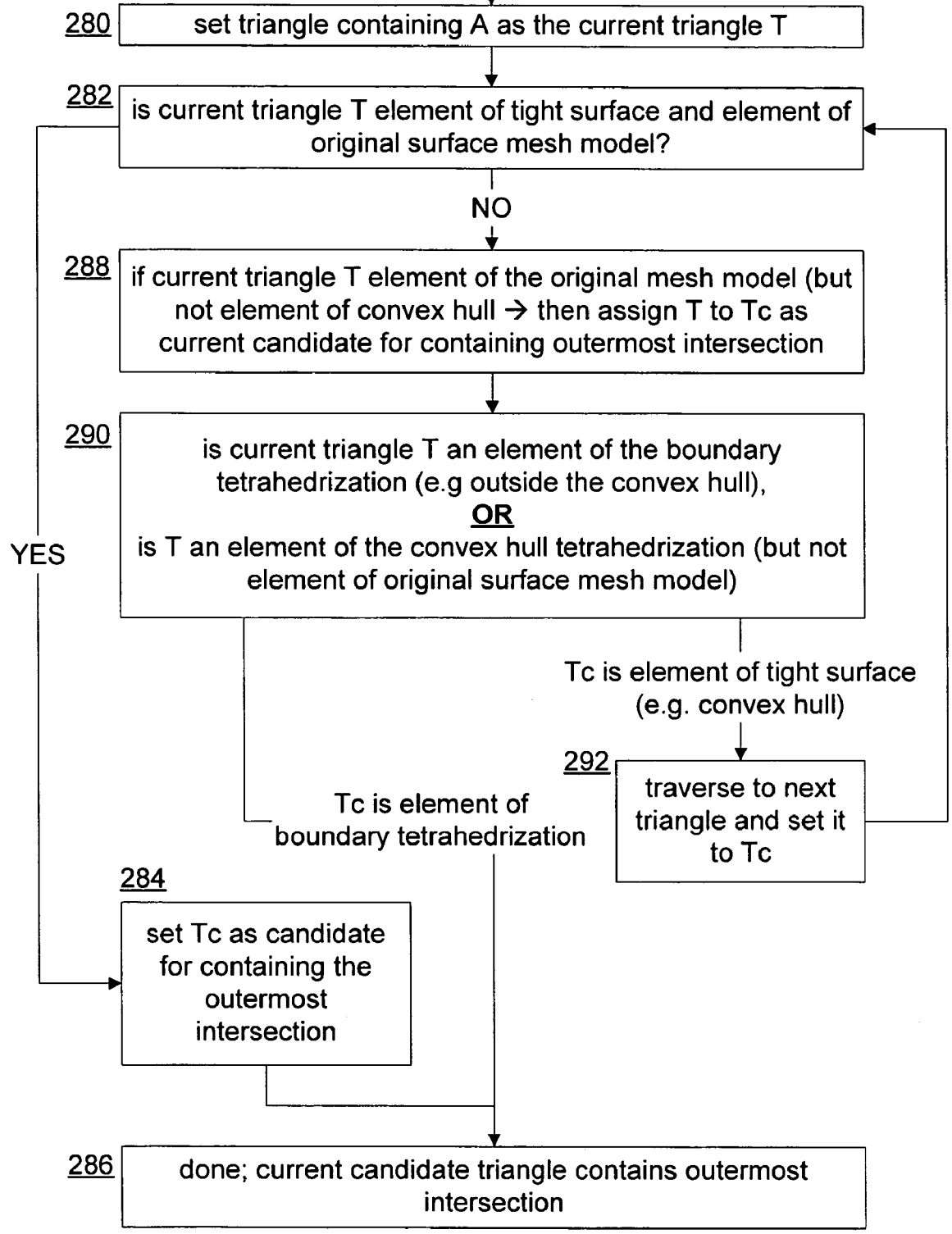
FIG. 15 shows a process for finding a closest (to the ray's origin) or outermost (from the object or surface model) point of intersection between a moved or perturbed ray and a model.

It is possible to move a ray or intersection point thereof on the surface of a model, or to find a second intersection point based on some operation (e.g. small translation or rotation) that moves a first intersection to a second nearby and possibly occluded second intersection point. There has not previously been any technique for efficiently determining whether that second intersection is the one closest to the origin of the ray or whether it is an outermost intersection relative to the intersected model (i.e. whether it is occluded). FIGS. 13-15 relate to efficiently making such a determination.

FIG. 13 shows a moved or second ray 240 resulting from a perturbation of the ray 192 relative to the object or model surface 164. Such a perturbation can result from a mouse movement, or a rotation or translation or transformation of either or both the ray 192 and the object or model surface 164. FIGS. 14 and 15 show a process for using the tessellations or tetrahedrizations discussed above to find a new closest/outermost point of intersection C.

FIG. 14 shows a process for finding or predicting a second point A on a surface based on a movement of a first point A' on the surface 164. Point A' may correspond to a first intersection point, and point A may correspond to a second intersection point. Starting 250 with previous intersection A, when a perturbation occurs 252, a nearby candidate intersection A is found 254. This can be done by testing for intersection with increasingly distant neighbors of the triangle containing A'. Starting with the triangle containing A' set 256 as a current candidate triangle for containing the second intersection, the current candidate triangle is tested 258 for intersection with the ray 240. If a neighbor-distance limit is reached 260, then it is assumed that the intersection with the ray 240 has jumped to a remote face of the model surface 164 or may have stopped intersecting the model surface 164. In the case where a neighbor triangle does not contain the intersection with ray 240, then the intersection with the model surface 164 may be found 264 anew using the process shown in FIG. 12 or possibly another intersection finding process (the manner of finding 264 can vary). If the limit of neighbors has not been reached 260, then a new nearby triangle of surface 164 (preferably) is set to be the current candidate triangle neighbor, and testing 258 for intersection with the ray is performed again. If the ray 240 does 258 intersect with the current candidate triangle, then that triangle is used as a basis for finding an outermost/closest intersection between the ray 240 and the model surface 164. That is to say, a backwards or outward traversal or walk along the ray starts at the triangle found to contain A by the process in FIG. 14.

FIG. 15 shows a process for finding a closest (to the ray's origin) or outermost (from the object or surface model) point of intersection between a moved or perturbed ray and a model. The process begins by setting 280 the triangle found to contain the point A to be the current triangle T. If the current triangle T is 282 an element of the tight inner surface 160 and is also an element of the original surface mesh model 164, then that current triangle T is known to be the triangle that contains or is the outermost intersection, so that triangle is set 284 to candidate triangle Tc, and the process is complete 286. Traversing triangles and traversing tetrahedrons is essentially the same, although the data used differs. The discussion above could equally be described in terms of tetrahedrons.

If the current triangle T is 282 not a convex triangle of the original surface model 164, then the current triangle T is tested to determine if 288 it is an element of the original mesh model, and if it is then it is assigned to Tc as the current candidate for containing the closest/outermost intersection. Next, it is determined if the current triangle T is 290 an element of the boundary tetrahedrization number 190, or if it is 290 an element of the tight inner surface tetrahedrization (exclusive of the original surface model 164). In the first case, the outer bounds of the object or surface model 164 have been reached, and it is no longer possible to find a triangle or tetrahedron of the object or surface model 164 that intersects the ray 240 and is also closer to the starting point of the ray 240 (or further from the object 164). In the second case, it is still possible that another further-out triangle of the object or surface model 164 may yet be found (because the tight inner surface has not yet been exited). Therefore the current triangle T is traversed 292 backward along the ray 240 to a next triangle, which is set to the current triangle T. The process is repeated by again testing whether the current triangle T is 282 an element of the tight inner surface 160 and also an element of the original mesh model 164, and so on.

In sum, the process shown in FIG. 15 marches backwards along ray 240, traversing triangles or tetrahedrons intersected by the ray 240 while determining whether any intersected faces of the original object or surface model 164 are closer to the ray's 240 source or origin. A traversed face that is part of the tight inner surface 160 will in most if not all cases be the face that is closest/outermost. If the intersection A lies on a face of the tight inner surface 160 that is part of the original model 164, then the process of FIG. 15 is: 280, 282, 284, and 286. A traversed face of the original surface 164 that is not part of the tight inner surface 160 will be the closest/outermost face unless a closer/further out face is later traversed.

It is unlikely if not impossible to encounter a further out face once the boundary tetrahedrization 190 has been reached. Different specific logic algorithms may be used to accomplish the overall determination of FIG. 15. For example, the tests 282, 288, and 290 may be performed in different orders. The procedure of FIG. 15 independent of the procedure of FIG. 14 does not require the outer bounding surface; the tight inner surface is sufficient.

Referring to FIG. 13 and its example ray 240, the first ray 192 originally intersects a face of the object or mesh model 164 at point A'. If the ray 192 is moved to ray 240, a face of the object 164 (which is a neighbor of the face found 254 to contain the point A) is the initial triangle for traversal testing to find 254 a triangle containing A. Starting from that triangle, tetrahedrons t12, t9, t8, and t7 are traversed 292 until the triangle containing the point B is encountered. This face is 288 a non-convex-hull part of the object 164, and is set as the current candidate Tc which might contain the outermost intersection unless another candidate is found.

However, because the boundary tetrahedrization 190 or the tight inner surface 160 has not been encountered, traversal continues. Tetrahedrons t17 and t19 are traversed 292 until the triangle containing the point C is encountered. This triangle is 282 an element of the tight inner surface 160 therefore testing is complete 286.

Variations and different uses of the process of FIG. 15 are possible. For example, the traversed or intersected triangles can be used to find the 5 (for example) closest intersections, after which transparency can fade out. The technique can be used to paint into a cloud using the X closest points of the cloud. If the ray represents a 3D brush, then all intersections within the brush volume can be found when the brush center (ray) moves. This can be done by finding the points or triangles along the ray that are closest to the center of the brush (rather than the eye).

Furthermore, the general idea of determining whether a second intersection is outermost or occluded can be used in conjunction with other techniques such as the voxel method. In other words, the idea of working backward from an intersection candidate and keeping track of the tight inner surface of the object can also be applied to a voxel data structure by using a voxel grid to check whether or not the intersection is the closest one. That is, starting with A', and predicting A, it is possible to check whether or not A is the closest intersection by walking the voxels. Voxels that define a fraction of space that is totally outside of the tight inner surface or convex hull can be flagged, which allows a walk of the voxels to stop as soon as it can be determined that no more intersections can occur. This method can be used independently of how the point A was determined.

Figure 16:
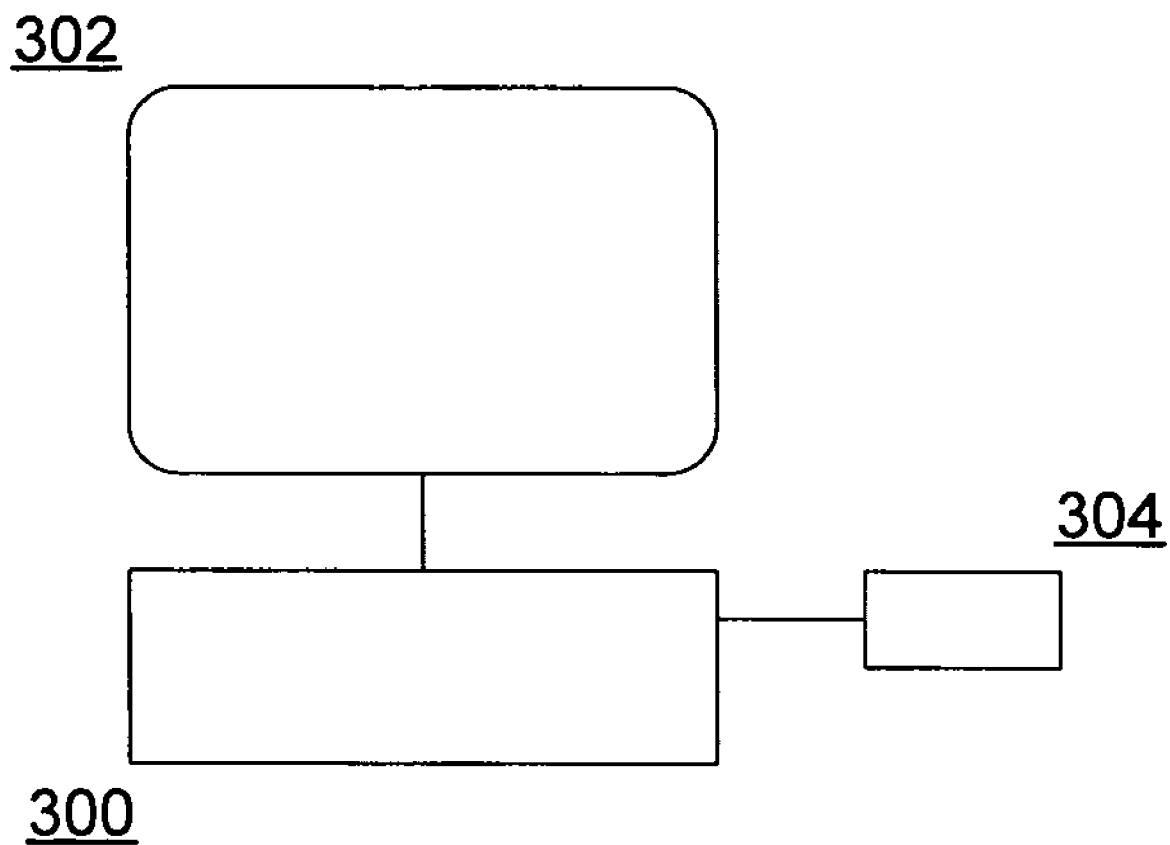
FIG. 16 shows a hardware apparatus.

FIG. 16 shows a hardware apparatus. The hardware apparatus can be configured to store and perform the information and methods discussed above. The hardware apparatus has a processing unit 300 with one or more CPUs, volatile storage such as RAM (not shown), non-volatile storage such as a disk drive or a CD-ROM or other storage medium, and other typical computer components. The hardware apparatus will also have a display 302 for displaying graphics generated according to the embodiments discussed above. The hardware apparatus will also have an input unit 304, such as a mouse, for a user to input control information for example to move a ray or object.

Another optimization can be achieved by storing the traversed triangles along the ray, projecting them to the plane orthogonal to the ray, and then intersecting them. This defines a tube. If the second ray (corresponding to point A) is still within the tube, then no computation is necessary and the point A is the closest intersection. The same approach can be used with cones of rays. Also, tetrahedrons can be used to validate a second intersection without computing any intersection for small changes of the intersecting ray.

The methods discussed herein are independent of dimension; the same methods can be equally applied to higher dimensions or to 2 dimensions. Also, even if a tetrahedron is used for simplicity, any other volume can be used, as long as the input object being intersected can share its boundary with those volumes. For example, deformed cubes could be used if the input mesh is made of quads. Or, curved tetrahedrons can be used for higher degree surfaces like NURBS or subdivision surfaces. This makes the process of traversing one cell more complicated, but can avoid using a triangulated mesh as an intermediate surface.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method of using a volatile or non-volatile computer-readable media or storage unit, the method comprising:
   storing a data structure for an original mesh surface that is provided with a bounding surface bounding the mesh surface and is provided with a tight inner surface, the data structure comprising:
   a first tessellation linking the tight inner surface to the original mesh surface; and
   a second tessellation linking the bounding surface to the tight inner surface, and
   using the data structure to at least one of: find an intersection with the original mesh surface; determine whether an intersection with the original mesh surface is occluded by the original mesh surface; and to identify an order of an intersection.

2. A method according to claim 1, wherein the order is an order of the intersection relative to other intersections.

3. A method according to claim 1, wherein the identifying the order further comprises for any given N identifying an Nth closest or Nth outermost intersection or identifying N outermost or closest intersections.

4. A method according to claim 1, wherein the finding, determining, or identifying is also based on a line intersecting the original mesh surface.

5. A method according to claim 1, wherein the finding comprises finding an intersection with the bounding surface, and using that intersection to find the intersection with the original mesh surface.

6. A method according to claim 5, further comprising traversing a path from the intersection with the bounding surface through the second tessellation to an intersection with the convex hull surface, and traversing through the first tessellation to thereby find the intersection with the original mesh surface.

7. A method according to claim 6, wherein the path corresponds to polygons or polyhedrons of the tessellations that intersect with a line that also determines the intersection with the bounding surface and also determines the intersection with the original mesh surface.

8. A method of automatically finding an intersection with an original mesh surface, the method comprising:
   finding an intersection with the original mesh surface by using an outer bounding surface, a tight inner surface that is both bounded by the outer bounding surface and wraps the original mesh surface and a tessellation between the inner bounding surface and the outer bounding surface; and
   one of displaying the intersection on a display and storing the intersection in a storage.

9. A method of automatically finding an intersection with an original mesh surface, the method comprising
   finding an intersection with the original mesh surface by using an outer bounding surface, a tight inner surface that is both bounded by the outer bounding surface and wraps the original mesh surface and a tessellation between the inner bounding surface and the outer bounding surface, wherein the finding of the intersection with the original mesh surface is performed according to an intersection with the outer bounding surface; and one of displaying the intersection on a display and storing the intersection in a storage.

10. A method of automatically finding an intersection with an original mesh surface, the method comprising:

finding an intersection with the original mesh surface by using an outer bounding surface and a tight inner surface that is both bounded by the outer bounding surface and wraps the original mesh surface, wherein the finding of the intersection with the original mesh surface is performed according to an intersection with the outer bounding surface, and wherein the tight inner surface comprises a convex hull, wherein there is a first tessellation between and linking the convex hull with the original mesh surface, wherein there is a second tessellation between and linking the convex hull with the outer bounding surface, and wherein the finding further comprises traversing a path from the intersection with the outer bounding surface through the second tessellation to an intersection with the convex hull surface, and traversing from the intersection with the convex hull surface through the first tessellation to thereby find the intersection with the original mesh surface; and one of displaying the intersection on a display and storing the intersection in a storage.

11. A method of automatically finding an intersection with an original mesh surface, the method comprising:

finding an intersection with the original mesh surface by using an outer bounding surface and a tight inner surface that is both bounded by the outer bounding surface and wraps the original mesh surface, wherein the finding of the intersection with the original mesh surface is performed according to an intersection with the outer bounding surface, and wherein the tight inner surface comprises a convex hull, wherein there is a first tessellation between and linking the convex hull with the original mesh surface, wherein there is a second tessellation between and linking the convex hull with the outer bounding surface, and wherein the finding further comprises traversing a path from the intersection with the outer bounding surface through the second tessellation to an intersection with the convex hull surface, and traversing from the intersection with the convex hull surface through the first tessellation to thereby find the intersection with the original mesh surface, wherein the path corresponds to polygons or polyhedrons of the tessellations that intersect with a line that also defines the intersection with the bounding surface and also defines the intersection with the original mesh surface; and one of displaying the intersection on a display and storing the intersection in a storage.

12. A method of automatically determining whether an intersection between a line and a mesh model is, relative to the mesh model, an outermost intersection between the line and the mesh model, the method comprising:

determining whether a polyhedron or polygon intersected by the line one of contains and is an outermost intersection with the line based on whether such polyhedron or polygon is on a convex hull surface of the mesh model using a tessellation linking the mesh model and the convex hull; and one of displaying the intersection on a display and storing the intersection in a storage.

13. A method of automatically determining whether an intersection between a line and a mesh model is, relative to the mesh model, an outermost intersection between the line and the mesh model, the method comprising:

determining whether a polyhedron or polygon intersected by the line one of contains and is an outermost intersection with the line based on whether such polyhedron or polygon is on a convex hull surface of the mesh model using a tessellation linking the mesh model and the convex hull, further comprising identifying the polyhedron or polygon by traversing polyhedrons or polygons that intersect the line; and one of displaying the intersection on a display and storing the intersection in a storage.

14. A method of automatically determining whether an intersection between a line and a mesh model is, relative to the mesh model, an outermost intersection between the line and the mesh model, the method comprising:

determining whether a polyhedron or polygon intersected by the line one of contains and is an outermost intersection with the line based on whether such polyhedron or polygon is on a convex hull surface of the mesh model using a tessellation linking the mesh model and the convex hull, further comprising traversing to a next polyhedron or polygon when a traversed polyhedron or polygon is inside an interior or convex region of the mesh model; and one of displaying the intersection on a display and storing the intersection in a storage.

15. A method of repeatedly moving an intersection of a ray with a mesh object, the method comprising:

detecting movements of the ray or the object, one relative to the other, and for some of the movements:

when the ray intersects the mesh object at a local neighbor of a face of the mesh object, determining whether intersection of the ray with the mesh object is occluded by the mesh object by traversing polygons not part of the mesh object; and when the ray does not intersect the mesh object at a local neighbor of a face of the mesh object, finding an intersection of the ray with the mesh object by traversing polygons intersected by the ray, where the polygons are not part of the mesh object and include at least one polygon of a bounding surface bounding the mesh object; and one of displaying the moved intersection on a display and storing the moved intersection in a storage.

16. An apparatus, comprising:

a storage unit storing: an original mesh surface that is provided with a bounding surface bounding the mesh surface, a convex hull surface of the original mesh surface, a first tessellation linking the convex hull to the original mesh surface, and a second tessellation linking the bounding surface to the convex hull, where the second tessellation tessellates a space between the bounding surface and the convex hull surface, and where the first tessellation tessellates a space between the convex hull surface and the original surface mesh; and a processing unit performing at least one of:

finding a first intersection between a ray and the original mesh by finding a first intersected polygon or polyhedron of the bounding surface, and then traversing adjacent intersected polygons or polyhedrons starting from the first intersection until the intersection is found; and finding a second intersection between the ray and the original mesh when the ray or original mesh have relatively moved, finding a polygon locally neighboring the first intersection and containing a first intersection with the moved ray, and traversing out from the neighbor polygon through adjacent polygons or polyhedrons intersected by the moved ray, and determining whether traversed polygons or polygons of traversed polyhedrons are unoccluded along ray based on whether they are part of the convex hull surface.

17. A method of automatically finding an intersection with an original mesh surface, the method comprising:

finding an intersection with the original mesh surface by using an outer bounding surface, using a tight inner surface that is both bounded by the outer bounding surface and wraps the original mesh surface and using details of an intersection with the outer bounding surface; and one of displaying the intersection on a display and storing the intersection in a storage.

* * * * *

UNITED STATES PATENT AND TRADEMARK OFFICE
CERTIFICATE OF CORRECTION

PATENT NO.       : 7,483,024 B2
APPLICATION NO.  : 10/748235
DATED            : January 27, 2009
INVENTOR(S)      : Maillot It is certified that error appears in the above-identified patent and that said Letters Patent is hereby corrected as shown below:

In the drawing:

Sheet 15 of 17 (Box No. 254) (Figure 14), Line 1, after "nearby" delete "nearby" (Second Occurrence).

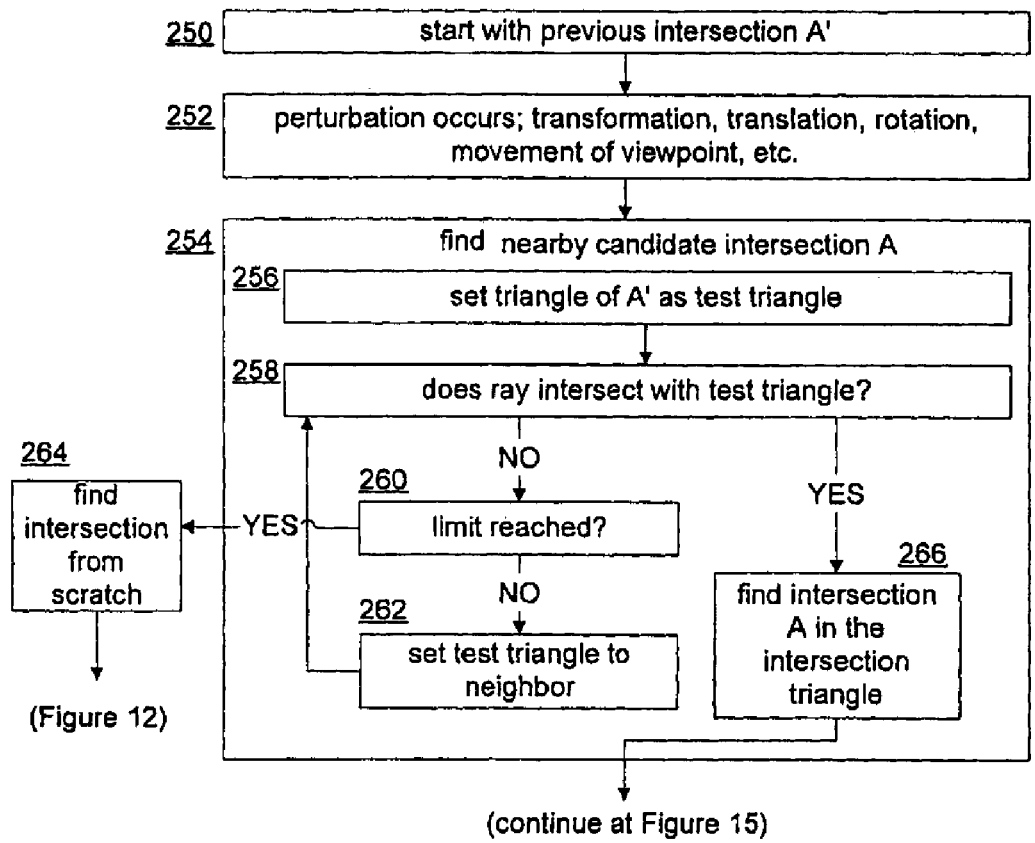

UNITED STATES PATENT AND TRADEMARK OFFICE
CERTIFICATE OF CORRECTION

PATENT NO. : 7,483,024 B2
APPLICATION NO. : 10/748235
DATED : January 27, 2009
INVENTOR(S) : Maillot It is certified that error appears in the above-identified patent and that said Letters Patent is hereby corrected as shown below:

Column 2, Line 15, change "maybe" to --may be--.

Column 3, Line 22, change "surface-of" to --surface of--.

Column 6, Line 10, change "of," to --of--.

Column 6, Line 47, change "({T1}are" to --{T1} are--.

Signed and Sealed this

Thirty-first Day of March, 2009

JOHN DOLL
*Acting Director of the United States Patent and Trademark Office*